US010733153B2

(12) United States Patent
Sengupta et al.

(10) Patent No.: US 10,733,153 B2
(45) Date of Patent: Aug. 4, 2020

(54) SNAPSHOT MANAGEMENT IN DISTRIBUTED FILE SYSTEMS

(71) Applicant: Red Hat, Inc., Raleigh, NC (US)

(72) Inventors: Avra Sengupta, Bangalore (IN); Rajesh Joseph, Bangalore (IN)

(73) Assignee: Red Hat, Inc., Raleign, NC (US)

(*) Notice: Subject to any disclaimer, the term of this patent is extended or adjusted under 35 U.S.C. 154(b) by 454 days.

(21) Appl. No.: 15/206,861

(22) Filed: Jul. 11, 2016

(65) Prior Publication Data

US 2017/0249335 A1 Aug. 31, 2017

(30) Foreign Application Priority Data

Feb. 29, 2016 (IN) .............................. 201641006893

(51) Int. Cl.
*G06F 16/188* (2019.01)
*G06F 16/11* (2019.01)
*G06F 16/13* (2019.01)
*G06F 16/16* (2019.01)
*G06F 16/182* (2019.01)
(Continued)

(52) U.S. Cl.
CPC .......... *G06F 16/188* (2019.01); *G06F 16/128* (2019.01); *G06F 16/137* (2019.01); *G06F 16/166* (2019.01); *G06F 16/1774* (2019.01); *G06F 16/183* (2019.01);
(Continued)

(58) Field of Classification Search
CPC ......................... G06F 9/45558; G06F 2201/84
USPC ......... 711/162, E12.103, 114, 161, E12.001, 711/170, 4, 146, 147, 150, 156, 163, 168, 711/172, 203; 717/127, 131, 133, 102, 717/117, 120, 124; 707/E17.005, E17.01, 707/999.01, 999.202, 999.206, 634, 827, 707/999.003, E17.007, E17.044, 610, 639, 707/640, 649, 687, 705, 740, 770, 818, 707/822, 823, 999.001, 999.008, 999.2
See application file for complete search history.

(56) References Cited

U.S. PATENT DOCUMENTS 7,634,679 B2   12/2009   Quintiliano
7,694,095 B2    4/2010   Nasre
(Continued)

OTHER PUBLICATIONS

"Managing GlusterFS Volume Snapshots," Gluster Docs, Administrator Guide, Managing Snapshots, 5 pages, downloaded from https://gluster.readthedocs.org/en/latest/Administrator%20Guide/Managing%20Snapshots/ on Dec. 22, 2015.
(Continued)

*Primary Examiner* — Jay A Morrison
*Assistant Examiner* — Ken Hoang
(74) *Attorney, Agent, or Firm* — Womble Bond Dickinson (US) LLP; Daniel E. Ovanezian

(57) ABSTRACT

A system and method are disclosed for managing snapshots of a distributed file system. In accordance with one implementation, a list of snapshots of a file system is presented to a user, where the snapshots include one or more active snapshots and one or more inactive snapshots. A request by the user to access one of the snapshots in the list is received. In response to determining that the requested snapshot is active, the user is provided access to the requested snapshot. In response to determining that the requested snapshot is inactive, the requested snapshot is activated and the user is provided access to the requested snapshot.

18 Claims, 3 Drawing Sheets

(51) Int. Cl.
   *G06F 16/176*   (2019.01)
   *G06F 16/23*   (2019.01)
(52) U.S. Cl.
   CPC ...... *G06F 16/1827* (2019.01); *G06F 16/2329* (2019.01); *G06F 16/2379* (2019.01)

(56) References Cited

U.S. PATENT DOCUMENTS

| | | | |
|---|---|---|---|
| 7,769,722 B1* | 8/2010 | Bergant | G06F 17/30212 |
| | | | 707/681 |
| 8,095,525 B2 | 1/2012 | Le et al. | |
| 8,225,057 B1* | 7/2012 | Zheng | G06F 11/1458 |
| | | | 711/114 |
| 8,255,634 B2 | 8/2012 | Young | |
| 8,612,495 B2 | 12/2013 | Akagawa et al. | |
| 9,146,727 B2 | 9/2015 | Arcese et al. | |
| 10,152,388 B1* | 12/2018 | Freitas | G06F 11/1453 |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2010/0205421 A1* | 8/2010 | Campbell | G06F 11/1417 |
| | | | 713/2 |
| 2012/0323853 A1 | 12/2012 | Fries et al. | |
| 2014/0089264 A1* | 3/2014 | Talagala | G06F 3/065 |
| | | | 707/649 |
| 2015/0161151 A1* | 6/2015 | Koryakina | G06F 17/30088 |
| | | | 711/114 |
| 2016/0092535 A1* | 3/2016 | Kuchibhotla | G06F 16/27 |
| | | | 707/634 |
| 2016/0117163 A1* | 4/2016 | Fukui | G06F 8/65 |
| | | | 717/171 |

OTHER PUBLICATIONS

"Enabling or disabling automatic Snapshot copies," Creation of Snapshot copy schedules, May 2013, 1 page, NetApp, Inc., downloaded from https://library.netapp.com/ecmdocs/ECMP1196991/html/GUID-3BEF34E6-BA8C-4526-925D-20279D6EBD32.html on Dec. 22, 2015.

"Working with snapshots," KB Parallels, created Nov. 3, 2018, last review Aug. 31, 2015, 3 pages, Parallels IP Holdings GmbH, downloaded from http://kb.parallels.com/en/5691 on Dec. 22, 2015.

* cited by examiner

SNAPSHOT MANAGEMENT IN DISTRIBUTED FILE SYSTEMS

RELATED APPLICATIONS

This application claims the benefit of priority to India Patent Application No. 2016/41006895, filed on Feb. 29, 2016, entitled "Snapshot Management in Distributed File Systems," the entirety of which is incorporated herein by reference herein.

TECHNICAL FIELD

This disclosure relates to computer systems, and more particularly, to file systems.

BACKGROUND

A snapshot of a file system is a copy of the state of the file system at a particular time. Some file systems internally track old versions of files and make snapshots available through a special namespace. Other file systems provide an operating system (OS) Application Programming Interface (API) for accessing file histories.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
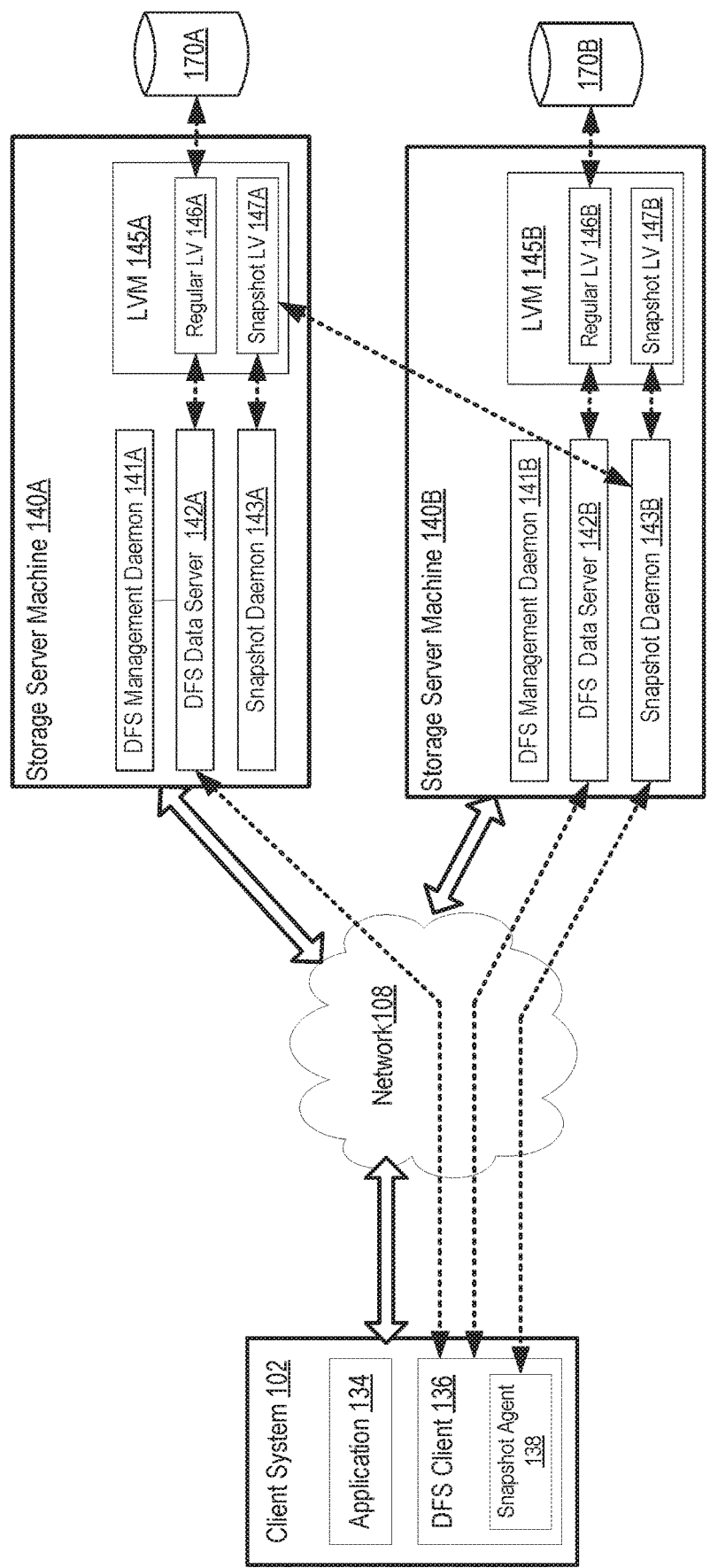
FIG. 1 depicts an illustrative computer system architecture, in accordance with an implementation of the present disclosure.

Described herein is a system and method for managing user access to snapshots of a distributed file system. A snapshot of a file system is a copy of the state of the file system at a particular time. In accordance with one implementation, a processing device presents to a user a list of snapshots of a distributed file system, where the snapshots comprise one or more active snapshots and one or more inactive snapshots. An active snapshot refers to a snapshot whose associated processes (e.g., a data-serving process, a snapshot-management process, etc., as described below), are running, and an inactive snapshot refers to a snapshot that does not have any associated running processes. In one example, the presenting is in response to the user navigating to a designated subdirectory of a directory (e.g., via a cd change directory command, etc.), and submitting a command to list the contents of the designated subdirectory (e.g., an ls command, etc.). In one example, the designated subdirectory is a virtual subdirectory named .snaps.

The processing device subsequently receives a request by the user to access one of the snapshots in the list. In response to determining that the requested snapshot is active, the user is provided access to the requested snapshot. In response to determining that the requested snapshot is inactive, the requested snapshot is activated, as described in detail below with respect to FIG. 2, and the user is then provided access to the activated snapshot. In response to determining that the current number of active snapshots exceeds a threshold, an active snapshot is selected for deactivation, and the selected snapshot is deactivated, thereby establishing a limit on resources devoted to maintaining active snapshots, as is described in detail below with respect to FIG. 2.

In one example, the processing device determines whether the current number of active snapshots exceeds the threshold after the requested snapshot is activated. In another example, prior to activating the requested snapshot, the processing device checks whether activation of the requested snapshot will cause the current number of active snapshots to exceed the threshold. If it will, an active snapshot is selected for deactivation and the selected snapshot is deactivated prior to activating the requested snapshot.

In some implementations, an active snapshot might be selected in accordance with a deactivation policy, such as selecting an active snapshot that is used less frequently during a prior time interval than any other active snapshot (e.g., as quantified by a measure such as how many times an active snapshot is accessed, the total time for which an active snapshot is accessed, etc.).

In one example, the list of file system snapshots is presented in response to a user navigating to a directory (e.g., via a cd command, via a chdir command, etc.) and listing the contents of a designated virtual subdirectory of the directory (e.g., a virtual subdirectory named .snaps). It should be noted that although the present disclosure is described in the context of distributed file systems, implementations of the present disclosure can also be employed for traditional centralized file systems.

Accordingly, aspects of the present disclosure enable users and administrators to select from all snapshots, both active and inactive, while keep the resource usage associated with maintaining active snapshots to a manageable level.

FIG. 1 depicts an illustrative distributed file system architecture 100 for various implementations of the disclosure. In FIG. 1 the three wide solid-line arrows denote network connections, and the dotted line arrows denote logical data paths between entities of the distributed file system. It should be noted that other architectures are possible, and implementations are not necessarily limited to the specific architecture depicted by FIG. 1.

The distributed file system 100 may include one or more server machines 140, each coupled to a respective storage resource 170, and one or more client machines 102 and connected via a network 108. The distributed file system 100 is a client/server based file system that is capable of storing files, portions of files, replicas and so forth across a plurality of storage resources. The network 108 may be a public network (e.g., the Internet), a private network (e.g., a local area network (LAN) or wide area network (WAN)), or a combination thereof. Network 108 may include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc. It should be noted that the fact that FIG. 1 depicts two server machines 140, two storage resources 170, and one client machine 102 is merely illustrative; distributed file system 100 may have a fewer or greater number of storage server machines 140, and/or a fewer or greater number of storage resources 170, and/or a greater number of client machines 102.

A storage server machine 140A-B may include a network-accessible server-based functionality (e.g., storage server 143A-B) or other data processing equipment. The storage server machines 140A-B may include, but are not limited to, any data processing device, such as a desktop computer, a laptop computer, a mainframe computer, a personal digital assistant, a rack-mount server, a hand-held device or any other device configured to process data. The storage server machines 140A-B of the distributed file system 100 may be grouped into one or more clusters. A cluster may be a group of linked storage servers 143A-B working together closely.

The storage resources 170A-B may be mass storage devices, such as magnetic or optical storage based disks, solid-state drives (SSDs) or hard drives, coupled to the storage server machines 140A-B (either directly or via the network 108). The storage resources 170A-B may also include memory such as random access memory (RAM), Flash memory, and so forth. For convenience, some implementations provided herein may be described with reference to disks or other mass storage devices. However, it should be understood that such implementations may also apply to memory storage resources.

In one implementation, each storage server machine 140 comprises a distributed file system (DFS) data server 142 that manages the storage of data on corresponding storage resource 170. In one implementation, DFS data server 142 is capable of creating "regular" (non-snapshot) directories, partitions, logical volumes, and so forth on storage resources 170 as well as store data (e.g., files) thereon. In one example, DFS data server 142 employs a local disk file system such as EXT3, EXT4, XFS, NTFS, FAT16, FAT32, and so forth. Various flash file systems, tape file systems, optical disc file systems, memory files systems and so on may alternatively be used for other non-disk storage resources (e.g., for memory storage resources).

The distributed file system 100 may store data as files and may include directories, also referred to as folders, which are virtual containers within the distributed file system 100, in which groups of computer files and possibly other directories may be kept and organized. The distributed file system 100 may organize data (e.g., files) in the disks 170A-B using volumes. A volume may be a single accessible storage area of the distributed file system 100 that may be resident on a single partition or directory of a hardware resource 170A-B (e.g., of a hard disk) of the file system 100. A volume may be a representation of a logical location, rather than a physical location, of a storage area in the file system 100. For example, a physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. Additionally, the volume may be a collection of multiple logical and/or physical locations.

In some implementations, a volume of the distributed file system 100 may be associated with multiple storage servers and storage resources 170A-B. Files of a volume may be stored across the storage resources 170A-B. For example, a volume label "C:" may be assigned to a partition or portion of a first storage resource 170A and a partition or portion of a second storage resource 170B. As such, files of a single volume may be distributed between multiple storage resources 170A-B that are managed by multiple storage servers 140A-B. Thus, files of a volume may be stored across one or more storage servers. In some implementations, the files of the volume may be distributed across multiple directories (e.g., a hierarchical path) that are associated with multiple storage servers.

In one implementation, regular files might be stored in portions (e.g., data blocks, data bricks, entire files, directories, etc.) across a plurality of storage resources 170. In one example, DFS data server 142 communicates with storage resource 170 via an abstracted view called a logical volume manager (LVM). In one aspect, LVM 145 comprises a regular logic volume (VM) 146 for "regular" (non-snapshot) files, and a snapshot LV 147 for snapshots, as described below.

Any number of client systems 102 may include a DFS client 136 to communicate with the storage server machines 140A-B in the distributed file system 100. The client system 102 may be a computing device such as a server computer, a desktop computer, a set-top box, a gaming console, a television, a portable computing device such as, and not limited to, mobile telephones, personal digital assistants (PDAs), portable media players, netbooks, laptop computers, electronic book reader, and the like. The client machines 102 may host one or more applications 134. An application 134 may be any type of application including, but not limited to, a web application, a desktop application, a browser application, etc. An application 134 may request access (e.g., read, write, etc.) to the data in the distributed file system 100. For example, the application 134 may request to read or write files stored in a volume associated with storage resources 170A-B.

As shown in FIG. 1, DFS client 136 is capable of communicating with both storage server machines 140A-B via the network 108, thereby enabling client system 102 to transmit a plurality of messages, either sequentially or in parallel, to retrieve multiple portions of a regular file or a plurality of regular files. For systems comprising more than two storage server machines 140, DFS client 136 is capable of communicating with all of the servers.

Snapshot daemon 143 of storage resource machine 140 is a background process that communicates with storage resource 170 via snapshot LV 147 and is capable of processing requests for snapshots and retrieving data of the requested snapshots (e.g., portions of snapshots, entire snapshots, etc.). In cases where a snapshot is stored in a distributed fashion (e.g., a portion of a snapshot stored by storage resource 170A and another portion of the snapshot stored by storage resource 170B, etc.), the snapshot daemons of the corresponding storage server machines 140 are capable of communicating with each other and coordinating the retrieval of snapshot data from the corresponding storage resources. This capability enables the snapshot agent 138 of client system 102 to be "thin" (e.g., less required memory, smaller code footprint, less processor usage, etc.), thereby limiting its use of resources of the client system 102 (e.g., memory, processor cycles, communication ports, outbound and incoming messages to process, etc.). Some operations of snapshot agent 138 and snapshot daemons 143 are described below with respect to FIG. 2.

DFS management daemon 141 is a background process capable of performing tasks related to managing volumes. Such tasks might include exposing logical volumes (LVs) to clients, mounting volumes (e.g., in response to client mount commands, etc.), and so forth.

Figure 2:
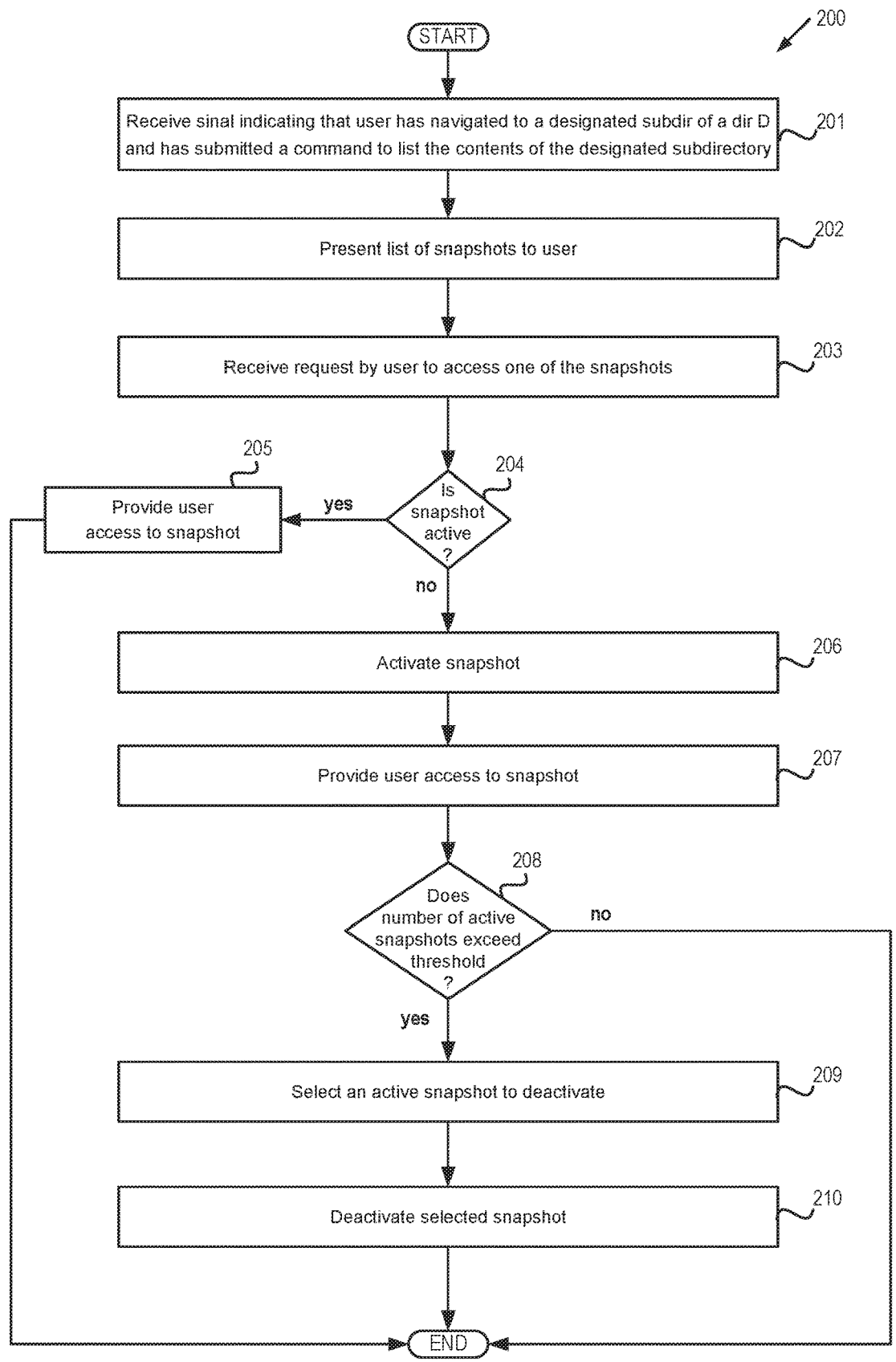
FIG. 2 depicts a flow diagram of one implementation of a method by which a computer system manages snapshots of a distributed file system.

FIG. 2 depicts a flow diagram of one implementation of a method 200 by which a computer system manages snapshots of a file system. The method is performed by processing logic that may comprise hardware (circuitry, dedicated logic, etc.), software (such as is run on a general purpose computer system or a dedicated machine), or a combination of both. In one implementation, the method is performed by one or more snapshot daemons 143 of storage server machines 140, while in some other implementations, some or all of the method might be performed by one or more other entities. It should be noted that in some implementations blocks depicted in FIG. 2 may be performed simultaneously or in a different order than that depicted. For example, in one implementation the order of blocks 206 through 210 might be rearranged so that blocks 208 through 210 are executed prior to blocks 206 and 207.

At block 201, a signal is received indicating that a user of client system 102 has navigated to a designated subdirectory of a directory D and has submitted a command to list the contents of the designated subdirectory. It should be noted that in some implementations, the navigation and submitting of the command may be input by the user via a command-line window, while in some other implementations the navigation and submitting of the command may be input via a graphical user interface (e.g., of an administration tool, etc.). In one example, the designated subdirectory is a virtual subdirectory named .snaps that is hidden in any type of listing command (e.g., ls, ls-a, etc.) and is intended for showing available snapshots to users or administrators who are aware of the subdirectory's existence and wish to access a snapshot. In one implementation, block 201 is performed by one or more of DFS data servers 142 in response to one or more messages sent from DFS client 136 to the DFS data server(s).

At block 202, the user is presented with a list of active and inactive snapshots of the distributed file system, where each of the snapshots captures the state of the distributed file system in and below directory D (e.g., the state of all children directories, grandchildren directories, etc.) at a particular time.

At block 203, a request by the user to access one of the listed snapshots is received. The request to access a particular snapshot might be via a navigation command (e.g., cd <name of snapshot>, etc.), via a listing command (e.g., ls <name of snapshot>, etc.), or via some other read-only command. In one implementation, the request is transmitted by snapshot agent 138 to one of the snapshot daemons 143 via network 108.

Block 204 branches based on whether the requested snapshot is active. If the requested snapshot is active, execution proceeds to block 205, otherwise execution continues at block 206.

At block 205, the user is provided access to the requested snapshot. In one implementation, block 205 is performed by snapshot agent 138. After block 205 is performed, the execution of method 200 terminates.

At block 206, the requested snapshot is activated. In one implementation, the activation of the requested snapshot comprises the starting of a set of processes associated with the requested snapshot. In one example, the set of processes includes a data-serving process (e.g., DFS data server 142, etc.), a snapshot-management process (e.g., snapshot daemon 143, etc.), and a self-healing daemon (not depicted in FIG. 1) for handling failures.

At block 207, the user is provided access to the requested snapshot. In one implementation, a message is sent from snapshot agent 138 to a particular snapshot daemon (e.g., snapshot daemon 143B, as shown in FIG. 1), and the particular snapshot daemon sends messages to its corresponding snapshot logical volume (e.g., snapshot LV 147B) and to one or more other snapshot logical volumes (e.g., snapshot LV 147A, as shown in FIG. 1).

Block 208 tests whether the current number of active snapshots exceeds a particular threshold. (The activation of the requested snapshot at block 206 will increase the number of active snapshots by one, unless one or more other active snapshots have been deactivated [e.g., by some other concurrent process, by a system administrator, etc.].) If the current number of active snapshots exceeds the threshold, execution continues at block 209, otherwise the execution of method 200 terminates. In some examples, the threshold might be set by a system administrator (e.g., via a command that sets an attribute value, via a configuration file, etc.), while in some other examples the threshold might be hard-coded in snapshot daemons 143.

At block 209, an active snapshot is selected for deactivation. In some implementations, an active snapshot might be selected arbitrarily, while in some other implementations an active snapshot might be selected in accordance with a deactivation policy. For example, in some implementations the deactivation policy might select an active snapshot that is used less frequently during a prior time interval than any other active snapshot (e.g., as quantified by a measure such as how many times an active snapshot is accessed, the total time for which an active snapshot is accessed, etc.), while some other implementations might employ another type of deactivation policy. In one example, block 209 is performed by one or more snapshot daemons 143.

At block 210 the selected snapshot is deactivated. In one implementation, the deactivation of the selected snapshot comprises stopping the set of processes associated with the selected snapshot. In one example, block 210 is performed by a snapshot daemon 143.

Figure 3:
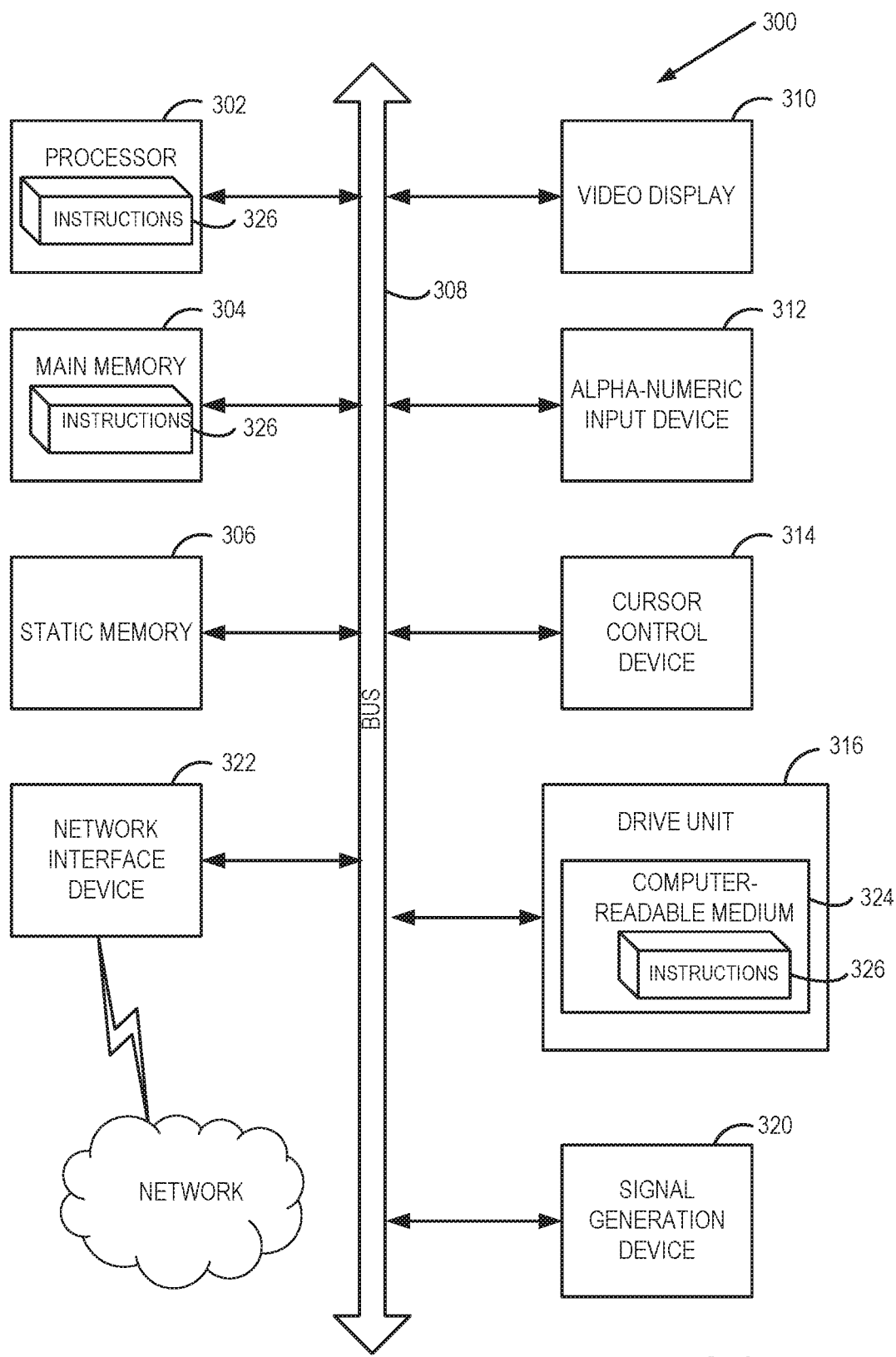
FIG. 3 depicts a block diagram of an illustrative computer system operating in accordance with implementations of the disclosure.

FIG. 3 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 306.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the method of FIG. 2, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an illustrative implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

In the foregoing description, numerous details have been set forth. It will be apparent, however, to one skilled in the art, that implementations of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "providing", "activating", "selecting", "presenting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, implementations of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. implementations of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
  presenting to a user, by a processing device, a list of snapshots of a distributed file system, wherein the snapshots comprise one or more active snapshots and one or more inactive snapshots, and wherein:
    the one or more active snapshots are associated with one or more running processes comprising a data-serving process; and the one or more inactive snapshots are not associated with one or more running processes;
receiving, by the processing device, a request by the user to access one of the snapshots in the list;
in response to determining that the requested snapshot is active, providing, to the user, access to the requested snapshot; and
in response to determining that the requested snapshot is inactive:
activating the requested snapshot by starting a set of processes comprising the data-serving process and associating the set of processes with the requested snapshot,
providing to the user, after the activating, access to the requested snapshot; and
in response to determining, after the activating, that a number of active snapshots exceeds a threshold number of active snapshots, selecting an active snapshot and deactivating the selected active snapshot, wherein the threshold number of active snapshots corresponds to a limit on resources of the distributed file system that are devoted to active snapshots.

2. The method of claim 1 wherein the presenting is in response to the user navigating to a designated subdirectory of a directory and submitting a command to list the contents of the designated subdirectory and wherein the designated subdirectory is a virtual subdirectory.

3. The method of claim 2 wherein each snapshot of the list of snapshots is presented as a respective subdirectory of the virtual subdirectory, and wherein providing access to a snapshot in the list of snapshots enables the user to navigate to the respective subdirectory.

4. The method of claim 1 wherein the data-serving process serves data associated with snapshots of the distributed file system and a second process that serves data associated with files of the distributed file system.

5. The method of claim 1 wherein the selecting is in view of a measure of how frequently one or more of the snapshots are accessed during a prior time interval.

6. The method of claim 1 wherein the user is associated with a client machine, and wherein accessing a file of the distributed file system comprises transmitting a first message from the client machine to a first server machine and a second message from the client machine to a second server machine, and wherein accessing a snapshot of the distributed file system comprises transmitting a third message from the client machine to the first server machine and a fourth message from the first server machine to the second server machine.

7. The method of claim 1, wherein:
the one or more running processes further comprise a snapshot-management process, and
activating the requested snapshot further comprises starting the snapshot-management process and associating the snapshot-management process with the requested snapshot.

8. An apparatus comprising:
one or more storage devices to store data associated with a distributed file system; and
a processing device, operatively coupled to the one or more storage devices, to:
present to a user a list of snapshots of the distributed file system, wherein the snapshots comprise one or more active snapshots and one or more inactive snapshots, and wherein:

the one or more active snapshots are associated with one or more running processes comprising a data-serving process; and
the one or more inactive snapshots are not associated with one or more running processes;
receive a request by the user to access a first snapshot that is in the list;
in response to determining that the first snapshot is active, provide, to the user, access to the first snapshot; and
in response to determining that the first snapshot is inactive:
determine whether activation of the first snapshot will cause a number of active snapshots to exceed a threshold number of active snapshots, wherein the threshold number of active snapshots corresponds to a limit on resources of the distributed file system that are devoted to active snapshots;
in response to determining that the activation will cause the number of active snapshots to exceed the threshold number of active snapshots, select a second snapshot that is active and deactivate the selected second active snapshot;
activate the first snapshot by starting a set of processes comprising the data-serving process and associating the set of processes with the requested snapshot; and
provide to the user, after the activating of the first snapshot, access to the first snapshot.

9. The apparatus of claim 8 wherein the presenting is in response to the user navigating to a designated subdirectory of a directory and submitting a command to list the contents of the designated subdirectory and wherein the designated subdirectory is a virtual subdirectory.

10. The apparatus of claim 9 wherein each snapshot of the list of snapshots is presented as a respective subdirectory of the virtual subdirectory, and wherein providing access to a snapshot in the list of snapshots enables the user to navigate to the respective subdirectory.

11. The apparatus of claim 8 wherein the data-serving process serves data associated with snapshots of the distributed file system and a second process that serves data associated with files of the distributed file system.

12. The apparatus of claim 8 wherein the selecting is in view of a measure of how frequently one or more of the snapshots are accessed during a prior time interval.

13. The apparatus of claim 8 wherein the user is associated with a client machine, and wherein accessing a file of the distributed file system comprises transmitting a first message from the client machine to a first server machine and a second message from the client machine to a second server machine, and wherein accessing a snapshot of the distributed file system comprises transmitting a third message from the client machine to the first server machine and a fourth message from the first server machine to the second server machine.

14. A non-transitory computer readable storage medium, having instructions stored therein, which when executed, cause a processing device to:
present to a user, by the processing device, a list of snapshots of a distributed file system, wherein the snapshots comprise one or more active snapshots and one or more inactive snapshots and wherein:
the one or more active snapshots are associated with one or more running processes comprising a data-serving process; and the one or more inactive snapshots are not associated with one or more running processes;
receive, by the processing device, a request by the user to access one of the snapshots in the list;
in response to determining that the requested snapshot is active, provide, to the user, access to the requested snapshot; and
in response to determining that the requested snapshot is inactive:
  determine whether activation of the first snapshot will cause a number of active snapshots to exceed a threshold number of active snapshots, wherein the threshold number of active snapshots corresponds to a limit on resources of the distributed file system that are devoted to active snapshots;
  in response to determining that the activation will cause the number of active snapshots to exceed the threshold number of active snapshots, select a second snapshot that is active and deactivate the selected second active snapshot and
  activate the requested snapshot by starting a set of processes comprising the data-serving process and associating the set of processes with the requested snapshot and provide access to the requested snapshot to the user after the activating.

15. The non-transitory computer readable storage medium of claim 14 wherein the data-serving process serves data associated with snapshots of the distributed file system and a second process that serves data associated with files of the distributed file system.

16. The non-transitory computer readable storage medium of claim 14 wherein the presenting is in response to the user navigating to a designated subdirectory of a directory and submitting a command to list the contents of the designated subdirectory.

17. The non-transitory computer readable storage medium of claim 16 wherein the designated subdirectory is a virtual subdirectory, and wherein each snapshot of the list of snapshots is presented as a respective subdirectory of the virtual subdirectory, and wherein providing access to a snapshot in the list of snapshots enables the user to navigate to the respective subdirectory.

18. The non-transitory computer readable storage medium of claim 14 wherein the user is associated with a client machine, and wherein accessing a file of the distributed file system comprises transmitting a first message from the client machine to a first server machine and a second message from the client machine to a second server machine, and wherein accessing a snapshot of the distributed file system comprises transmitting a third message from the client machine to the first server machine and a fourth message from the first server machine to the second server machine.

* * * * *